United States Patent
Brown

(10) Patent No.: US 6,402,451 B1
(45) Date of Patent: Jun. 11, 2002

(54) DRIVE ACROSS LOW-PROFILE PORTABLE HYDRAULIC TRAILER DUMPER

(76) Inventor: Herbert Louis Brown, P.O. Box 47, Dublin, TX (US) 76446

( * ) Notice: Subject to any disclaimer, the term of this patent is extended or adjusted under 35 U.S.C. 154(b) by 0 days.

(21) Appl. No.: 09/411,995

(22) Filed: Oct. 4, 1999

(51) Int. Cl.[7] ............................................... B65G 67/30
(52) U.S. Cl. ........................ 414/362; 414/582; 414/583; 414/421
(58) Field of Search ................................ 414/401, 474, 414/475, 476, 680, 362, 373, 385, 495, 572, 421, 582, 580, 800, 809; 269/17

(56) References Cited

U.S. PATENT DOCUMENTS

| | | | | |
|---|---|---|---|---|
| 516,053 A | * | 3/1894 | Hulett | 414/362 |
| 2,014,369 A | * | 9/1935 | Culemeyer | 414/583 |
| 3,819,070 A | * | 6/1974 | Clarke et al. | 414/362 |
| 3,866,935 A | * | 2/1975 | Nelson | 414/476 X |
| 4,944,646 A | * | 7/1990 | Edwards et al. | 414/919 X |
| 5,366,336 A | * | 11/1994 | Friesen et al. | 414/476 |
| 5,427,497 A | * | 6/1995 | Dillman | 414/919 X |
| 5,458,451 A | * | 10/1995 | Bratlie et al. | 414/481 X |
| 5,739,477 A | * | 4/1998 | Queen | 414/484 X |
| 6,019,568 A | * | 2/2000 | Bratlie | 414/583 |

* cited by examiner

*Primary Examiner*—Frank E. Werner

(57) ABSTRACT

A drive across low-profile portable hydraulic trailer dumper for dumping the contents from a trailer containing a dumpable material, includes a towable elongated frame. A base frame with a deck pivotally attached hereto, which closes down and interlocks with the base frame. Making the overall height of the lift deck only seven (7) inches above the ground or pad site. Removable tread plates for use, when pulling a tractor and trailer forward, onto the trailer dumper. The lift deck has an adjustable chock for positioning the trailer during dumping. Actuators raise and lower the deck between a lowered position adjacent the base frame and a raised position for dumping the trailer contents. The trailer dumper has opposing cantilever wheels located near the back end of the dump for lowering a back end base frame to the support surface at the dump site, and raising a back end of a trailer dumper for towing. The low-profile trailer dumper has telescoping stabilizers located inside the base frame, and positioned under the deck lift actuators. Actuators located near the front of the base frame, lift and lower a front end of the frame between a low-profile dumping position for receiving the trailer and a raised towing position for hitching and towing the trailer dumper, from first dump location to a second dump location. A method of successively removing the contents from a plurality of trailers using the trailer dumper is also provided.

7 Claims, 5 Drawing Sheets

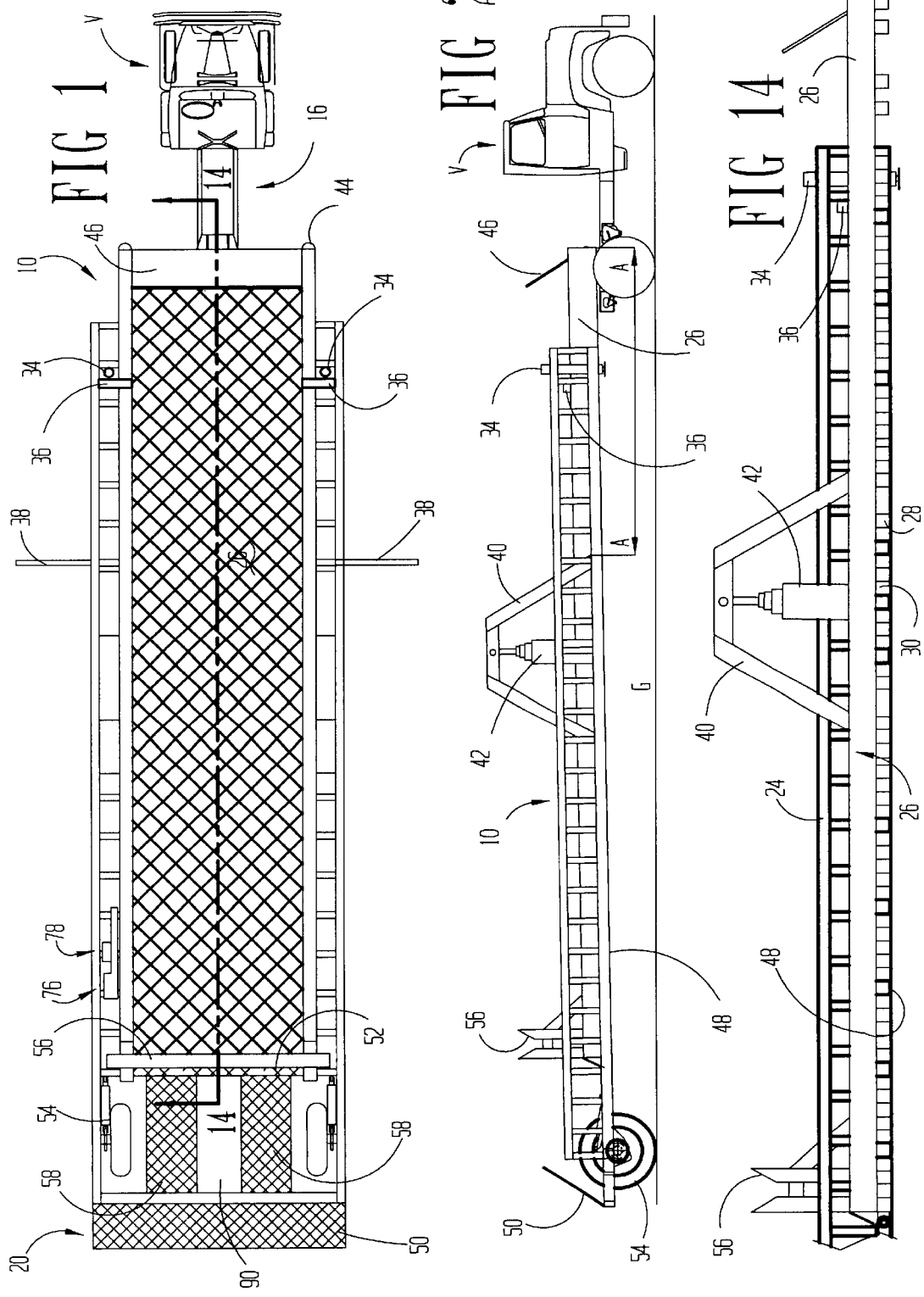

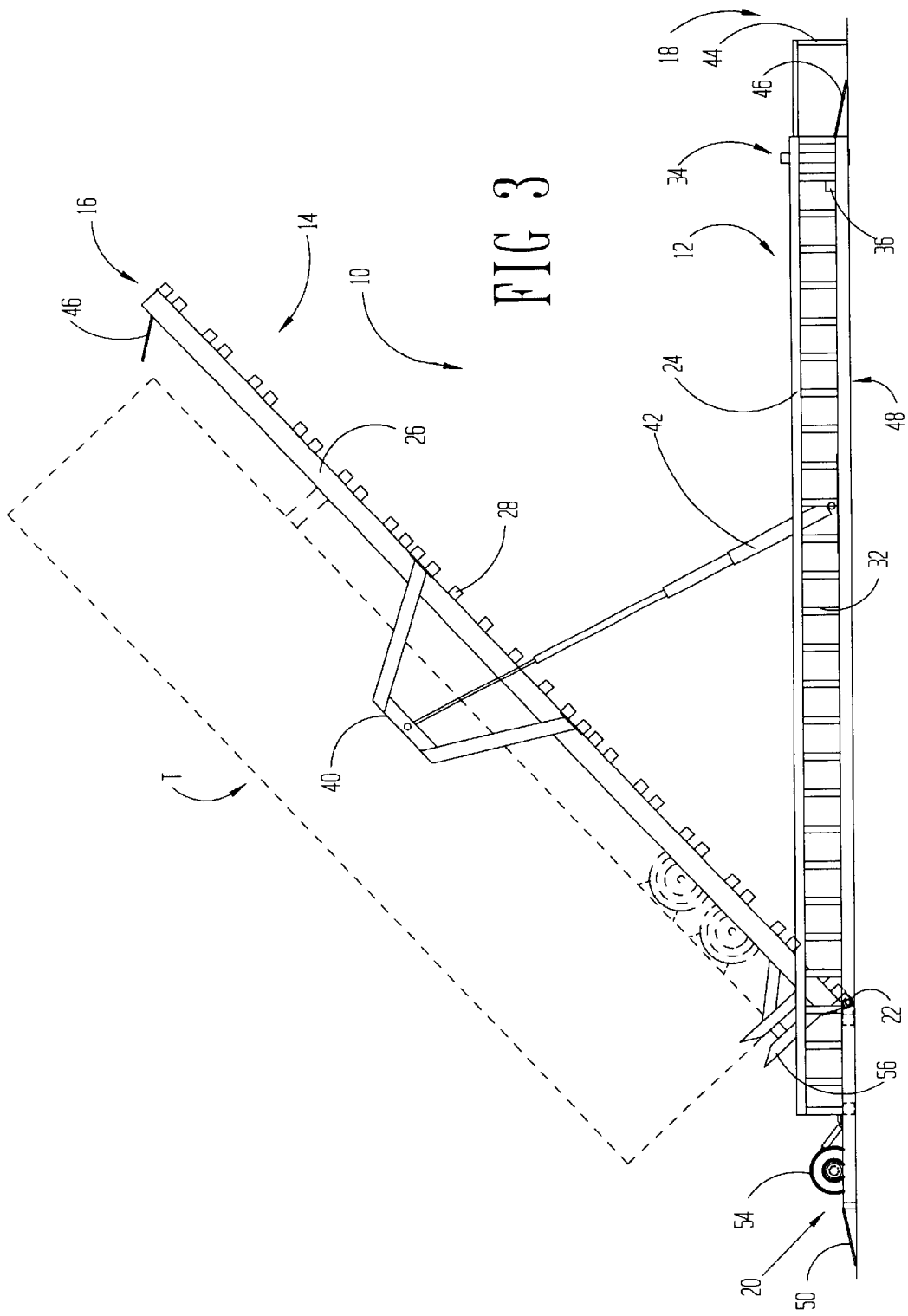

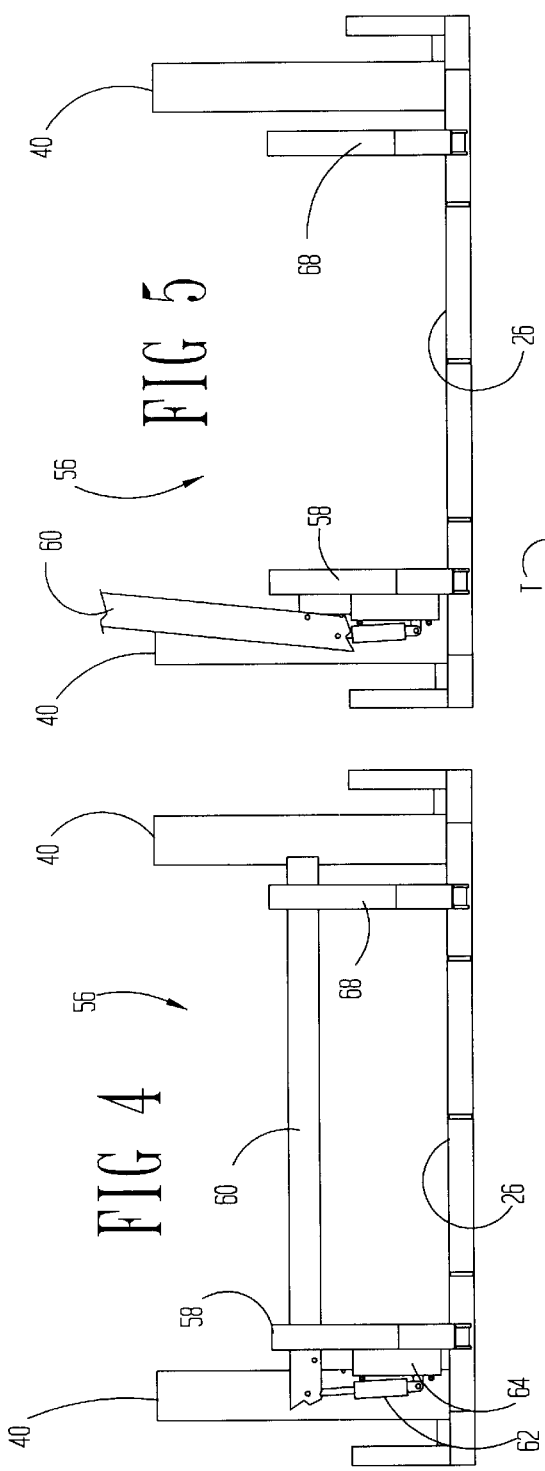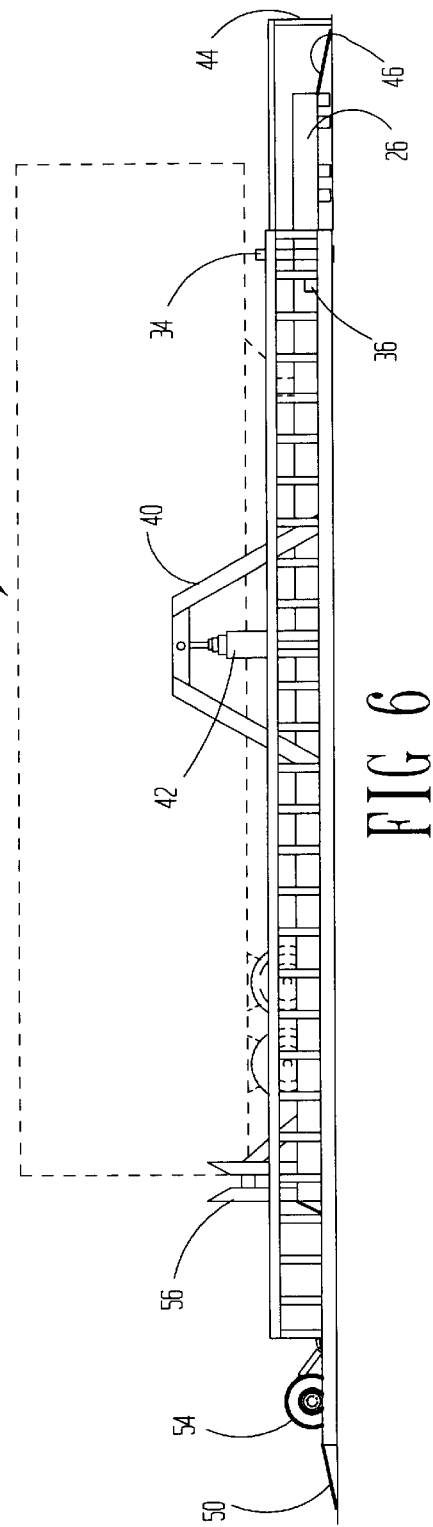

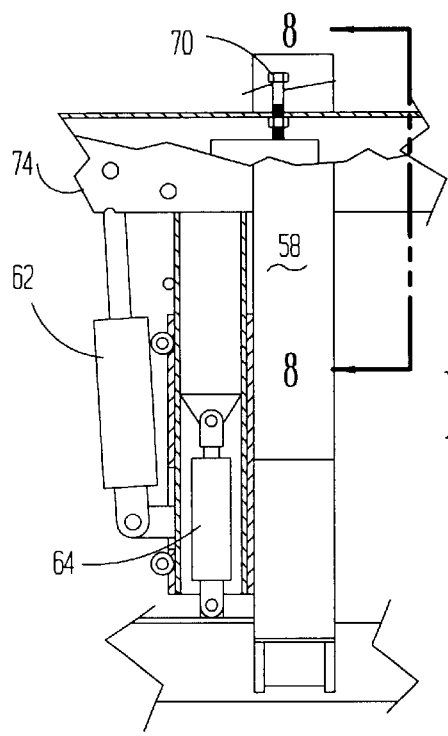
FIG 7
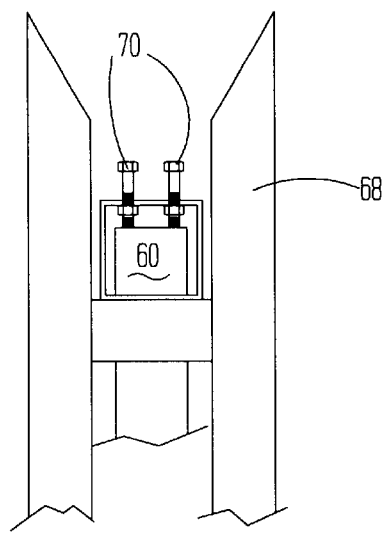
FIG 8
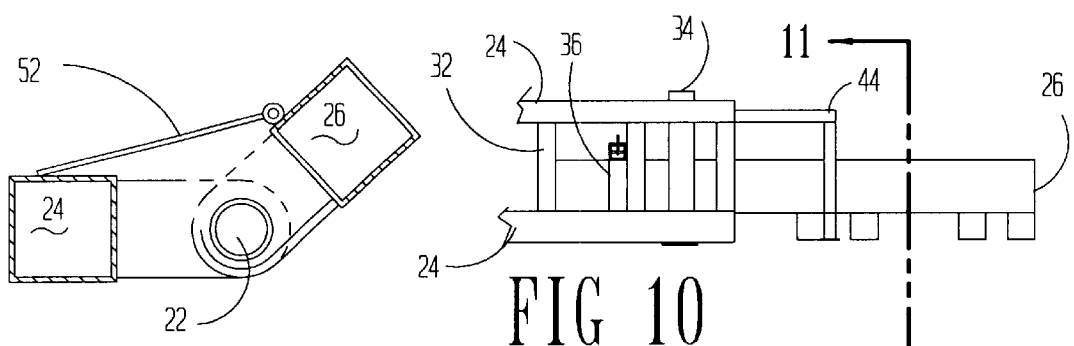
FIG 9
FIG 10
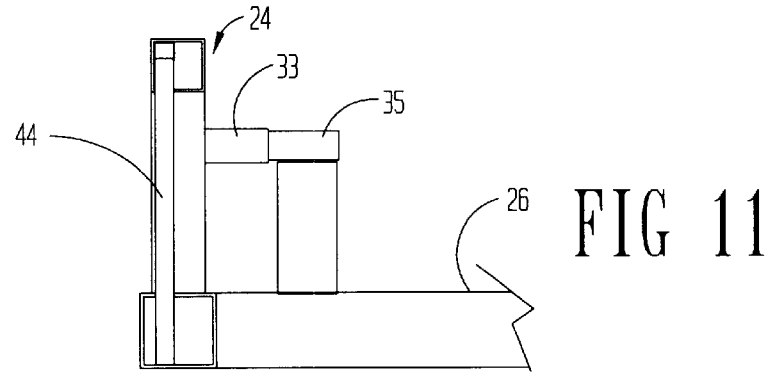
FIG 11

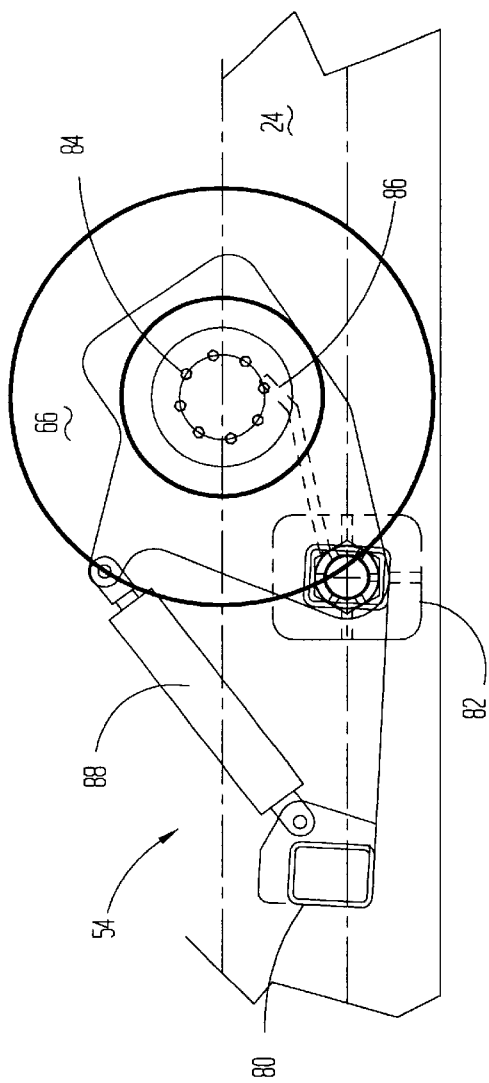
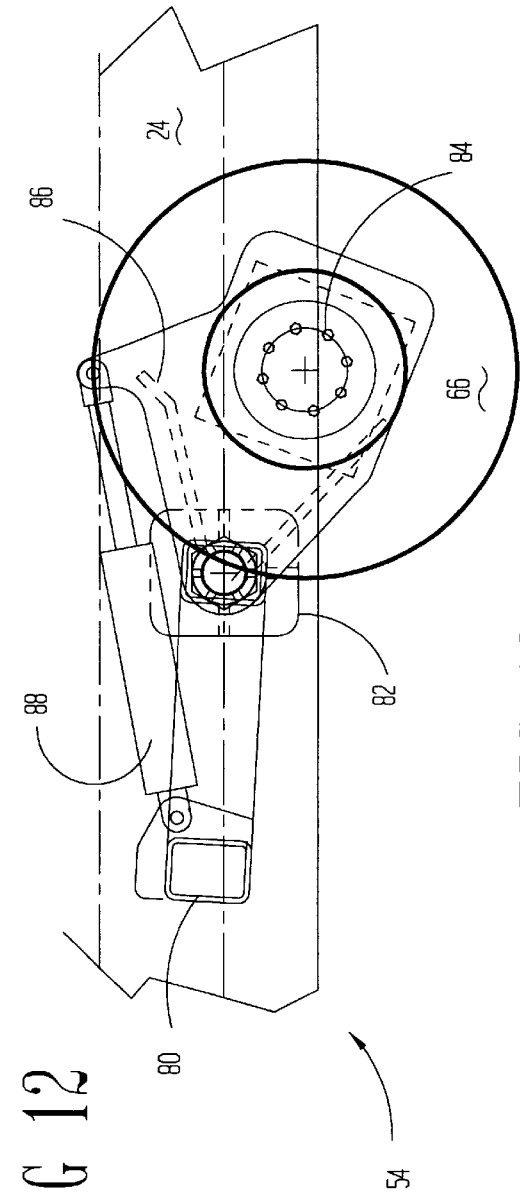
FIG 12
FIG 13

DRIVE ACROSS LOW-PROFILE PORTABLE HYDRAULIC TRAILER DUMPER

BACKGROUND OF THE INVENTION

The present invention relates generally to a trailer dumper for dumping the contents from a trailer containing a dumpable material, and more particularly to an improved portable dumper and an improved method of removing the contents form such a trailer. For example, such a dumper and method may be used to dump peanuts from trailers at a storage site.

A variety of portable trailer dumpers have been used to dump peanuts and such from semi-truck haulable trailers at storage sites, warehouses, storage elevators, and other commercial type sites. One known dumper includes a haulable frame having a front end hitchable to a semi-truck for moving the dumper between different dumping sites.

This known dumper includes an upwardly pivoting deck attached to the frame back end. The deck has an upwardly extending backstop adjacent the back end of the deck to retain a trailer during dumping. Two hydraulic actuators are mounted to the frame and underside the deck to push the deck from a lowered position for dumping the contents of the trailer. To power the hydraulic actuators, the tipper includes a hydraulic power unit mounted to the frame underside midway between the frame front and back ends.

In a lowered position adjacent the frame, the deck is substantially level at a height of nearly eleven feet about the ground surface upon which the dumper is located. To bridge this distance, the dumper has a detachable ramp extending downward from the frame front end. The frame also includes a permanently mounted intermediate ramped section for bridging a gap between the deck and the detachable ramp.

This known dumper includes front and rear stabilizer wings extending outwardly from the frame sides, with each wing having a ground-engaging float with screwtype height adjustment means. The stabilizers are adjustable to level the deck. The stabilizer floats are removed from the stabilizer wings and the wings are folded back against the frame for towing the dumper for moves between locations at a given site, the stabilizer floats and ramp must be removed and placed on the dumper.

To use this known dumper, a driver backs a trailer containing a dumpable material onto the detachable ramp, across the intermediate ramp and onto the deck until the trailer engages the deck backstop. To unhook the trailer for dumping, the driver gets out of the truck cab, which is nearly as high as the deck (approximately eleven feet above the ground surface). Any fall from such a height may seriously injure the driver. Thus, this dumper requires handrails and barriers along the edges of the ramps and deck.

The basic manufacturing costs of such handrails and barriers increase the initial cost of the known dumper. Furthermore, there are the labor cost associated with disassembling and reassembling the handrails and barriers when moving the dumper from one location at a dump site to another location at the same dump site.

Dumpers are inherently susceptible to side loading when the deck is elevated to dump a trailer. For example, side loading may occur when a strong cross wind blows against a side of a trailer during dumping. The deck acts as a movement arm and side loading force applies a torque to the frame. To prevent frame deformation by twisting during such side loading the known frame requires great amounts of reinforcing steel and larger and heavier steel members in the frame. The additional reinforcing steel increases dumper manufacturing costs, as well as making the dumper heavy to haul, which increases fuel costs associated with moving the dumper.

Thus, a need exists for am improved trailer dumper and method for dumping the contents from a trailer containing a dumpable material, which is not susceptible to the above limitations and disadvantages.

OBJECTS OF THE INVENTION

Accordingly, it is the principal object of the present invention to provide a novel drive across, low-profile, portable hydraulic trailer dumper.

Another object of the present invention is to provide a novel drive across, low-profile, portable hydraulic trailer dumper for unloading flat floor trailers.

Yet another object of the present invention is to provide a novel drive across, low-profile, portable hydraulic trailer dumper which incorporates a hydraulic adjustable chock block apparatus for placing the chock block securely inline and tightly against the trailer bumper, regardless of the trailer size or height of the trailer bumper location.

A still further object of the present invention is to provide a novel drive across, low-profile, portable hydraulic trailer dumper that can be safely and quickly moved from a first dump location to a second dump location as needed.

And yet another object of the present invention is to provide a novel drive across, low-profile, portable hydraulic trailer dumper, having duel hydraulic rams for lifting the front end of the dump, in order that it can be attached to a truck and moved from a first dump location to a second dump location.

A still further object of the present invention is to provide a novel drive across, low-profile, portable hydraulic trailer dumper, having opposing telescoping stabilizing arms.

Yet another object of the present invention is to provide a novel drive across, low-profile, portable hydraulic trailer dump that can safely and easily be operated by an individual operator.

A further object of the present invention is to provide a novel drive across, low-profile, portable hydraulic trailer dumper that is detachably attachable to a tractor truck for transporting from a first dump location to a second dump location.

A still further object of the present invention is to provide a novel drive across, low-profile, portable hydraulic trailer dumper with duel hydraulic cantilever wheels which lowers the dump until it rest on a solid surface, and is ready for, dumping operations, and then raises the dump for transporting from a first dump location a second dump location.

And, another object of the present invention is to provide a novel drive across, low-profile, portable hydraulic trailer dumper that can safely and easily be moved by an individual operator.

Another object of the present invention is to provide a novel drive across, low-profile, portable hydraulic trailer dumper that provides superior strength and geometry by design of the cross frame tubular members.

And yet, another object of the present invention is to provide a novel drive across, low-profile, portable hydraulic trailer dumper whereas the lift deck floor cross member frame closes into the corresponding base frame when lowered, thereby decreasing the elevation profile even further.

A still further object of the present invention is to provide a novel drive across, low-profile, portable hydraulic trailer dumper for unloading bulk materials having relatively poor flow properties.

Another object of the present invention is to provide a novel drive across, low-profile, portable hydraulic trailer dumper for unloading the bulk material contents of a carrier unit.

Yet another object of the present invention is to provide a novel drive across, low-profile, portable hydraulic trailer dumper for unloading a bulk material having relatively poor flow properties, utilizing gravity flow.

A further object of the present invention is to provide a novel drive across, low-profile, portable hydraulic trailer dumper for unloading bulk materials having relatively poor flow characteristics.

A still further object of the present invention is to provide a novel drive across, low-profile, portable hydraulic trailer dumper apparatus.

Still a further object of the present invention is to provide a novel drive across low-profile, portable hydraulic trailer dumper which is relatively simple in construction, comparatively inexpensive to manufacture and service, and is safe and simple to operate.

Another object of the present invention is provide a novel drive across, low-profile, portable hydraulic trailer dumper with pull-out safety hand rails, that are used during operations of the trailer dumper.

Yet another object of the present invention is to provide a novel drive across low-profile portable hydraulic trailer dumper with an automatic safety gate which extends across the front end of the dump and connects to the pull-out safety hand rails, thus preventing accidental access to the area directly under the lift deck.

A still further object of the present is to provide a drive across low-profile, portable hydraulic trailer dumper with removable tread ramps located at the rear of the dumper frame, which when installed, allows access for a tractor to pull a trailer on to and across the lift deck in order to position the trailer for the dumping operation, the ramps are then removed during the dumping, once the dumping operation is completed and the empty trailer is removed, the process is repeated as necessary.

Other objects and advantages of the present invention will become more apparent to those persons having ordinary skill in the art to which the present invention relates, from the following description taken in conjunction with the accompanying drawings, wherein:

BRIEF DESCRIPTION OF THE DRAWINGS

FIG. 1 is a plan top view of a drive across low-profile, portable hydraulic trailer dumper of the present invention, with the stabilizer arms extended, shown hitched to a tractor.

FIG. 2 is a side elevational view of a drive across low-profile, portable hydraulic trailer dumper of the present invention, shown hitched to a tractor.

FIG. 3 is side elevational view of a drive across low-profile, portable hydraulic trailer dumper, shown in its intended environment, with the lift deck raised for dumping the dumpable contents of a trailer.

FIG. 4 is a rear elevational view of a chock block, of a drive across low-profile, portable hydraulic trailer dumper, in the lowered chock block position.

FIG. 5 is a rear elevational view of a chock block, of a drive across low-profile, portable hydraulic trailer dumper, shown in a raised (open) position, thereby allowing access of a tractor and trailer to the lift deck on a dump.

FIG. 6 is a side elevational view of a drive across low-profile, portable hydraulic trailer dumper, shown is a trailer positioned and chocked.

FIG.7 is a cut-away view of a chock block arm apparatus and the hydraulic actuators.

FIG. 8 is a cut-away view of a saddle-lock apparatus for chock block arm of drawing FIG. 7.

FIG. 9 is a cut-away view of a lift deck hinged extension apron plate and pivot pin, of a drive across low-profile, portable hydraulic trailer dumper.

FIG. 10 is a cut-away elevational view of a base frame and lift deck lock, also shown is a retractable safety handrail of a drive across low-profile, portable hydraulic trailer dumper.

FIG. 11 is a cut-away front elevational view of a base frame and lift deck lock and safety handrail of drawing FIG. 10.

FIG. 12 is a cut-away view of a cantilever wheel apparatus, of a drive across low-profile, portable hydraulic trailer dumper, shown in a non-operational position, raised to allow the base frame to rest on a secure surface such as the ground or support pad, in preparation of dumping operations.

FIG. 13 is a cut-away view of a cantilever wheel apparatus, of a drive across low-profile, portable hydraulic trailer dumper, shown in an operational position, lowered to raise the rear base frame for transporting the trailer dumper of FIGS. 1 and 2.

FIG. 14 is a representational view taken from the middle of the dumper, and shows the interlocking steel tubular crossmembers.

DETAILED DESCRIPTION OF A PREFERRED EMBODIMENT

FIGS. 1 thru 14 illustrates an embodiment of the present invention, a DRIVE ACROSS PORTABLE LOW-PROFILE HYDRAULIC TRAILER DUMPER 10 hitched to a truck V for transport from a first location to a second location. A dumper 10 having an elongated frame 12 with opposing front and back ends 18 and 20, an upper load deck 26 and an underside frame 48. Dumper frame 12 having a pair of opposing side rail supports 24 extending from the front end 18 to the back end 20 of dumper frame 12. The upper and lower support members of side rails 24 are connected by vertical frame support members 32 at various positions along the length of side rails 24. A pair of opposing lift actuators 34 are located a first distance from the front end of a dumper frame 18, attached to dumper frame 12 adjacent to load deck 26 with the actuator pistons in a downward position for engaging the ground G surface when powered thereby lifting a front end of dumper 10, and lowering the front end of a dumper 10, when the powered pressure is released. Such as FIG. 2, in order for the truck V to be unhitched and moved away from the dumper 10, the front lift actuators 34 are powered to engage the ground G surface and to cause dumper 12 to lift upwardly in order for the towing truck V to be unhitched and driven out from under dumper frame 12, the powered pressure to front lift actuators 34 may be then released, thereby lowering a front end 18 of a dumper 12 into a lowered position. A front drive on-off ramp is pivotally attached to the front end 16 of load deck 26, when the dumper 10 is in a lowered dumping position FIG. 3, a front ramp 46 is lowered to engage the ground G surface, for driving a trailer on or off the dumper 10, FIG. 2 shows a drive across portable low-profile. trailer dumper hitched to a truck V, for moving from a first location to a second location, with the front ramp 46 is in a raised position for transporting. FIGS. 1, 10 and 11 a pair of opposing load deck and frame locks 36, located a first distance from front end 16 of dumper frame 12 attached to side rail 24 and support member 32, adjacent the load deck 26, comprising; a vertical support member attached adjacent vertical support member 32, a horizontal hollow frame member 33, attached to the top of a vertical support member, for receiving a smaller sliding horizontal frame member 35, a safety lock pin inserted into a pin lock hold provided in top of horizontal frame member and corresponding pin lock hole in sliding lock member, for securely and safely locking dumper frame 12 to load deck 26, when transporting the trailer dumper 10 from a first location to a second location. FIGS. 1, 3, 6, 10 and 11 a pair of opposing safety hand rails 44 located at front of the dumper frame 16 enclosed in the top support member of side rails 24 extending outwardly and past a load deck 26 when the load deck 26 is in a lowered position, safety rails 44 having a leg extention for engaging the ground G surface, thereby supporting the hand rails, and for preventing accidental access to the area below the load deck 26 during dumping. Such as FIG. 6, shows the dumper 10 in a lowered position, with the safety hand rails 44 extended outwardly from the front of the dumper 18, and past the lowered load deck 26 and the lowered front drive on-off ramp 46 of the dumper 10, FIG. 3 shows the load deck 26 in a raised position during dumping, and the safety hand rails 44 extended, FIGS. 1 and 11 show the safety hand rails 44 recessed into the top support member of side rails 24 adjacent front vertical frame member 32 in a closed position for transporting the dumper from a first location to a second location. FIG. 1 a hitching means (not shown) located adjacent the load deck 26 shows a drive across portable low-profile trailer dumper 10 hitched to a towing truck V, and may be moved from a first location to a second location. Additionally, a pair of opposing stabilizing arms 38, located a first distance from the front end 16 of the dumper frame 12, enclosed in a support crossmember 30 of the dumper frame 12, for extending outwardly when the dumper is in a lowered position for dumping, and stabilizing the dumper 10 during dumping, the stabilizing arms 38 recess into a support crossmember 30 when the dumper 10 is in a raised position, hitched to a towing truck V, for moving from a first location to a second location. FIGS. 2, 3, 6 and 14 the load deck includes opposing elevated mounting members 40 extending outwardly and upwardly from the load deck frame and the frame upper surface, the elevated mounting members 40 located at A distance from the front end 18 of the load deck 26, a pair of opposing elevating actuators 42 attached to the load deck frame 26 and elevated mounting members 40. FIG. 14 is a representational view from the middle of the dumper 10, a load deck frame 26 and support crossmembers 28, support crossmembers 28 are layed-out, configured and welded to the underside of load deck frame, in order that when the load deck 26 is in a lowered position, the crossmember 30 of the dumper frame 12, which in turn are welded to the inside of the lower support member of side rails 24 support crossmembers of the dumper frame 12, are also layed-out and configured that, the corresponding support crossmembers of the load deck 26, and the corresponding support crossmember of the dumper frame 12, close into each other, causing, the load deck 26 support crossmembers 28, to enterlock with the support crossmembers 30 of the dumper frame 12, when load deck 26 is in the lowered position. FIG. 1 a fluid reservoir tank 76 is attached at a first distance from the load deck 26 back end, adjacent to side rail 24 and in front of the chock block 56, a power supply 78 for powering the dumper 10, attached on a reservoir tank 76. FIGS. 4, 5, 7 and 8 the load deck 26 has a chock block 56 extending upwardly from the load deck upper surface 26, located a first distance from the rearward most edge of the back end of load deck 26 the chock block comprising; the load deck 26 has a first elevated mounting means, extending upwardly from the load deck 26 side, above the load deck surface 26, such as 58, a cantilever arm 60 mounted in a cantilever saddle 74, an actuator 64, for adjusting the height of the cantilever 60 when the cantilever arm 60 is lowered in the block position FIG. 4 an actuator 62 for raising and lowering the cantilever chock block arm 60, attached adjacent the actuator 64 and the cantilever saddle 74. A second elevated mounting, extending upwardly from the load deck 26 side, above the load deck surface 26, such as 68 for receiving the cantilever chock block arm 60 when the cantilever chock block arm 60 is lowered in the block position FIG. 4. adjustment lock bolt 70 for attaching a cantilever chock block arm 60 in the cantilever saddle 74. FIG. 9 the dumper 10 has, such as a pivot pin 22 for pivotally attaching the load deck 26 back end to the dumper frame 12 back end. This pivotal attachment allows the load deck 26 to be moved between a lowered position with the load deck 26 adjacent the dumper frame 12, and a raised position with the load deck 26 front end 16 elevated above the dumper frame 12 (shown in phantom in FIG. 3) for dumping the contents from trailer T. An apron 52 is pivotally attached to the furthermost end of the back end of the load deck 26, extending on to dumper frame 12. FIG. 1 a pair of opposing removable tread plate 58, located a first distance behind the further most end of back end of load deck 26 and extending to the further most end of the the dumper frame 12 back end. FIGS. 12 and 13 a pair of opposing cantilever wheels 54 attached to the dumper frame 12, a first distance from the further most end 20 of the dumper frame 12, adjacent the tread plates 58. A dump area 90 for dumping the dumpable material from a trailer, when the removable treads 58 are removed to expose a dumpable area 90. A drive on-off ramp 50 is pivotally attached to the furthermost end of the back end of dumper frame 12. From the foregoing detailed description, it will be evident that there are a number of changes, adaptations and modifications of the present invention which will come within the province of those skilled in the art. However, it is intended that all such variations not departing from the spirit of the invention be considered as within the scope thereof as limited solely by the appended claims.

What is claimed is:

1. A portable low-profile dumper for dumping the contents from a trailer containing a dumpable material through a back opening of the trailer, such as peanuts, the dumper comprising: an elongated frame having a front end and a back end, an underside, two opposed side members, an upper load deck pivotally mounted on the elongated frame and having load deck locks; two opposed upper mounting members extending upwardly from each side of the load deck when the load deck is in a lowered position; a first drive on-off loading ramp pivotally attached to the frame back end, two opposed tread plates detachably attached to the back of the frame and the load deck, an apron pivotally attached to the back end of the load deck, two opposed actuators being mounted on the front end of the frame for lifting and lowering the frame front end, two opposed safety handrails mounted on the side members for extending out and past the load deck, two opposed cantilevered wheels for lowering the elongated frame's back end during dumping and lifting the dumper back end frame so as to permit movement of the dumper from a first dump site to a second dump site; a power means for powering the opposed actuators, opposed elevating actuators, an adjustable chock block and the cantilevered wheels; said load deck also having two opposed side rails and said load deck being pivotally attached to the frame back end, the chock block being located at a first distance from a load deck back end so that the trailer may be correctly positioned during dumping; said elevating actuators coupling the load deck to the frame for pivotally raising and lowering the load deck front end between a lowered position with the load deck adjacent the frame and a raised position with load deck front end above the frame; a hitching means mounted on the front end of the load deck for attaching said dumper to a towing truck; a second drive on-off ramp pivotally attached to the front end of the load deck for driving the trailer on or off the load deck; a stabilizing means attached to and extending outwardly from the dumper frame for stabilizing the dumper, said stabilizing means comprising two opposed support members located a first distance from the frame front end and attached to, and enclosed in a cross-member frame of the dumper frame, said support members being extended outwardly when the dumper is in the lowered position for dumping, and retracted back inside the crossmember frame when the dumper is in the raised position for moving the dumper from the first dump site to the second dump site.

2. A portable low-profile dumper according to claim 1 wherein the adjustable chock block can position different trailer bumper heights during dumping.

3. A low-profile dumper according to claim 1 further including a cantilever block arm for raising the chock block to allow a truck and the trailer to pass when pulling onto the dumper and lowering the chock block for chucking the trailer during dumping.

4. A portable low-profile dumper according to claim 1 further including a chock block saddle located forwardly of the deck back end and opposite the said chock block for receiving a chock block arm for chocking the trailer during dumping.

5. A portable low-profile dumper according to claim 1 wherein the opposed actuators include a pair of vertically adjustable rams mounted along each of the opposite frame sides adjacent the front end of said dumper frame and adapted to be lowered for engaging a ground surface adjacent the dumper for lifting the front end of the dumper when hitching or unhitching the dumper from the tow truck and being elevatable to disengage from the ground surface for permitting movement of the dumper.

6. A portable low-profile dumper according to claim 1 wherein the power unit comprises an electric motor and hydraulic reservoir, the motor being mounted on a first side of the dumper frame and the hydraulic reservoir being mounted on a second side of the frame.

7. A portable low-profile dumper according to claim 1 wherein the first drive on-off loading ramp is pivotally attached to the dumper frame back end so that the ramp may be pivoted downwardly to engage a ground surface adjacent the dumper when said dumper is in a rest position for receiving the trailer, and being pivoted upwardly to a raised position for permitting movement of the dumper from the first dump site to the second dump site.

* * * * *